US009641815B2

(12) United States Patent
Richardson et al.

(10) Patent No.: US 9,641,815 B2
(45) Date of Patent: May 2, 2017

(54) SUPER RESOLUTION AND COLOR MOTION ARTIFACT CORRECTION IN A PULSED COLOR IMAGING SYSTEM

(71) Applicant: Depuy Synthes Products, Inc., Raynham, MA (US)

(72) Inventors: John Richardson, Calabasas, CA (US); Laurent Blanquart, Westlake Village, CA (US)

(73) Assignee: DePuy Synthes Products, Inc., Raynham, MA (US)

( * ) Notice: Subject to any disclaimer, the term of this patent is extended or adjusted under 35 U.S.C. 154(b) by 292 days.

(21) Appl. No.: 14/214,311

(22) Filed: Mar. 14, 2014

(65) Prior Publication Data

US 2014/0267655 A1 Sep. 18, 2014

Related U.S. Application Data

(60) Provisional application No. 61/790,804, filed on Mar. 15, 2013, provisional application No. 61/790,487, (Continued)

(51) Int. Cl.

| | |
|---|---|
| ***H04N 5/235*** | (2006.01) |
| ***H04N 9/04*** | (2006.01) |
| ***H04N 5/232*** | (2006.01) |
| ***G06T 3/40*** | (2006.01) |
| *H04N 9/07* | (2006.01) |
| *H04N 13/02* | (2006.01) |
| *H04N 5/225* | (2006.01) |

(52) U.S. Cl.
CPC .......... *H04N 9/045* (2013.01); *G06T 3/4053* (2013.01); *H04N 5/23232* (2013.01); *H04N 9/07* (2013.01); *H04N 13/0239* (2013.01); *H04N 2005/2255* (2013.01)

(58) Field of Classification Search
CPC .................................................... H04N 5/2354
USPC ........................................................... 348/68
See application file for complete search history.

(56) References Cited

U.S. PATENT DOCUMENTS

| | | | |
|---|---|---|---|
| 3,666,885 | A | 5/1972 | Hemsley et al. |
| 4,011,403 | A | 3/1977 | Epstein et al. |

(Continued)

FOREIGN PATENT DOCUMENTS

| | | | |
|---|---|---|---|
| CN | 1520696 | A | 8/2004 |
| CN | 101079966 | A | 11/2007 |

(Continued)

OTHER PUBLICATIONS

Blumenfeld, et al. Three-dimensional image registration of MR proximal femur images for the analysis of trabecular bone parameters. Oct. 2008. [retrieved on Jul. 30, 2014] Retrieved from the internet: <URL: http://www.ncbi.nlm.nih.gov/pmc/articles/PMC2673590/>.

*Primary Examiner* — Christopher S Kelley
*Assistant Examiner* — Jonathan Messmore
(74) *Attorney, Agent, or Firm* — Terrence J. Edwards; TechLaw Ventures, PLLC

(57) ABSTRACT

The disclosure extends to methods, systems, and computer program products for producing an image in light deficient environments and associated structures, methods and features. The features of the systems and methods described herein may include providing improved resolution and color reproduction.

46 Claims, 8 Drawing Sheets

Related U.S. Application Data filed on Mar. 15, 2013, provisional application No. 61/791,473, filed on Mar. 15, 2013.

(56) References Cited

U.S. PATENT DOCUMENTS 4,363,963 A 12/1982 Ando
4,433,675 A 2/1984 Konoshima
4,436,095 A 3/1984 Kruger
4,473,839 A 9/1984 Noda
4,644,403 A 2/1987 Sakai et al.
4,651,226 A 3/1987 Motoori et al.
4,692,606 A 9/1987 Sakai et al.
4,740,837 A 4/1988 Yanagisawa et al.
4,741,327 A 5/1988 Yabe
4,742,388 A 5/1988 Cooper et al.
4,745,471 A 5/1988 Takamura et al.
4,773,396 A 9/1988 Okazaki
4,782,386 A * 11/1988 Ams ...................... A61B 1/042 348/371
4,786,965 A 11/1988 Yabe
4,832,003 A 5/1989 Yabe
4,845,555 A 7/1989 Yabe et al.
4,853,772 A 8/1989 Kikuchi
4,853,773 A 8/1989 Hibino et al.
4,866,526 A 9/1989 Ams et al.
4,884,133 A 11/1989 Kanno et al.
4,884,134 A 11/1989 Tsuji et al.
4,918,521 A 4/1990 Yabe et al.
4,924,856 A 5/1990 Noguchi
4,938,205 A 7/1990 Nudelman
4,942,473 A 7/1990 Zeevi et al.
4,947,246 A 8/1990 Kikuchi
4,953,539 A 9/1990 Nakamura et al.
4,959,710 A 9/1990 Uehara et al.
5,016,975 A 5/1991 Sasaki et al.
5,021,888 A 6/1991 Kondou et al.
5,047,846 A 9/1991 Uchiyama et al.
RE33,854 E 3/1992 Adair
5,103,497 A 4/1992 Hicks
5,111,804 A 5/1992 Funakoshi
5,133,035 A 7/1992 Hicks
5,187,572 A 2/1993 Nakamura et al.
5,188,094 A 2/1993 Adair
5,196,938 A 3/1993 Blessinger
5,200,838 A 4/1993 Nudelman et al.
5,220,198 A 6/1993 Tsuji
5,228,430 A 7/1993 Sakamoto
5,233,416 A 8/1993 Inoue
5,241,170 A 8/1993 Field, Jr. et al.
5,264,925 A 11/1993 Shipp et al.
5,313,306 A 5/1994 Kuban et al.
5,325,847 A 7/1994 Matsuno
5,402,768 A 4/1995 Adair
5,408,268 A 4/1995 Shipp
5,411,020 A 5/1995 Ito
5,427,087 A 6/1995 Ito et al.
5,454,366 A 10/1995 Ito et al.
5,494,483 A 2/1996 Adair
5,523,786 A 6/1996 Parulski
5,550,595 A 8/1996 Hannah
5,594,497 A 1/1997 Ahern et al.
5,665,959 A 9/1997 Fossum et al.
5,704,836 A 1/1998 Norton et al.
5,730,702 A 3/1998 Tanaka et al.
5,734,418 A 3/1998 Danna
5,748,234 A 5/1998 Lippincott
5,749,830 A 5/1998 Kaneko et al.
5,754,313 A 5/1998 Pelchy et al.
5,783,909 A 7/1998 Hochstein
5,784,099 A 7/1998 Lippincott
5,857,963 A 1/1999 Pelchy et al.
5,887,049 A 3/1999 Fossum
5,929,901 A 7/1999 Adair et al.
5,949,483 A 9/1999 Fossum et al.
5,986,693 A 11/1999 Adair et al.
6,023,315 A 2/2000 Harrold et al.
6,038,067 A 3/2000 George
6,043,839 A 3/2000 Adair et al.
6,139,489 A 10/2000 Wampler et al.
6,142,930 A 11/2000 Ito et al.
6,166,768 A 12/2000 Fossum et al.
6,184,922 B1 2/2001 Saito et al.
6,184,940 B1 2/2001 Sano
6,215,517 B1 4/2001 Takahashi et al.
6,222,175 B1 4/2001 Krymski
6,239,456 B1 5/2001 Berezin et al.
6,272,269 B1 8/2001 Naum
6,275,255 B1 8/2001 Adair et al.
6,292,220 B1 9/2001 Ogawa et al.
6,294,775 B1 9/2001 Seibel et al.
6,310,642 B1 10/2001 Adair et al.
6,320,331 B1 11/2001 Iida et al.
6,331,156 B1 12/2001 Haefele et al.
6,389,205 B1 5/2002 Muckner et al.
6,416,463 B1 7/2002 Tsuzuki et al.
6,429,953 B1 * 8/2002 Feng ...................... H04N 9/045 348/234
6,444,970 B1 9/2002 Barbato
6,445,022 B1 9/2002 Barna et al.
6,445,139 B1 9/2002 Marshall et al.
6,464,633 B1 10/2002 Hosoda et al.
6,466,618 B1 10/2002 Messing et al.
6,485,414 B1 11/2002 Neuberger
6,512,280 B2 1/2003 Chen et al.
6,627,474 B2 9/2003 Barna et al.
6,631,230 B1 10/2003 Campbell
6,659,940 B2 12/2003 Adler
6,665,013 B1 12/2003 Fossum et al.
6,677,992 B1 1/2004 Matsumoto et al.
6,690,466 B2 2/2004 Miller et al.
6,692,431 B2 2/2004 Kazakevich
6,707,499 B1 3/2004 Kung et al.
6,772,181 B1 8/2004 Fu et al.
6,773,392 B2 8/2004 Kikuchi et al.
6,791,739 B2 9/2004 Ramanujan et al.
6,796,939 B1 9/2004 Hirata et al.
6,799,065 B1 9/2004 Niemeyer
6,809,358 B2 10/2004 Hsieh et al.
6,838,653 B2 1/2005 Campbell et al.
6,841,947 B2 1/2005 Berg-johansen
6,847,399 B1 1/2005 Ang
6,856,712 B2 2/2005 Fauver et al.
6,873,363 B1 3/2005 Barna et al.
6,879,340 B1 4/2005 Chevallier
6,899,675 B2 5/2005 Cline et al.
6,900,829 B1 5/2005 Ozawa et al.
6,906,745 B1 6/2005 Fossum et al.
6,921,920 B2 7/2005 Kazakevich
6,933,974 B2 8/2005 Lee
6,947,090 B2 9/2005 Komoro et al.
6,961,461 B2 11/2005 MacKinnon et al.
6,970,195 B1 11/2005 Bidermann et al.
6,977,733 B2 12/2005 Denk et al.
6,982,740 B2 1/2006 Adair et al.
6,999,118 B2 2/2006 Suzuki
7,009,634 B2 3/2006 Iddan et al.
7,009,648 B2 3/2006 Lauxtermann et al.
7,030,904 B2 4/2006 Adair et al.
7,037,259 B2 5/2006 Hakamata et al.
7,068,878 B2 6/2006 Crossman-Bosworth et al.
7,071,979 B1 7/2006 Ohtani et al.
7,079,178 B2 7/2006 Hynecek
7,102,682 B2 9/2006 Baer
7,105,371 B2 9/2006 Fossum et al.
7,106,377 B2 9/2006 Bean et al.
7,119,839 B1 10/2006 Mansoorian
7,151,568 B2 12/2006 Kawachi et al.
7,159,782 B2 1/2007 Johnston et al.
7,184,084 B2 2/2007 Glenn
7,189,226 B2 3/2007 Auld et al.
7,189,961 B2 3/2007 Johnston et al.
7,208,983 B2 4/2007 Imaizumi et al.
7,252,236 B2 8/2007 Johnston et al.
7,258,663 B2 8/2007 Doguchi et al.

(56) References Cited

U.S. PATENT DOCUMENTS 7,261,687 B2 8/2007 Yang
7,280,139 B2 10/2007 Pahr et al.
7,298,938 B2 11/2007 Johnston
7,312,879 B2 12/2007 Johnston
7,319,478 B2 1/2008 Dolt et al.
7,355,155 B2 4/2008 Wang
7,356,198 B2 4/2008 Chauville et al.
7,365,768 B1 4/2008 Ono et al.
7,369,140 B1 5/2008 King et al.
7,369,176 B2 5/2008 Sonnenschein et al.
7,455,638 B2 11/2008 Ogawa et al.
7,470,229 B2 12/2008 Ogawa et al.
7,476,197 B2 1/2009 Wiklof et al.
7,532,760 B2 5/2009 Kaplinsky et al.
7,540,645 B2 6/2009 Kazakevich
7,544,163 B2 6/2009 MacKinnon et al.
7,545,434 B2 6/2009 Bean et al.
7,564,935 B2 7/2009 Suzuki
7,567,291 B2 7/2009 Bechtel et al.
7,573,516 B2 8/2009 Krymski et al.
7,573,519 B2 8/2009 Phan et al.
7,583,872 B2 9/2009 Seibel et al.
7,630,008 B2 12/2009 Sarwari
7,744,528 B2 6/2010 Wallace et al.
7,783,133 B2 8/2010 Dunki-Jacobs et al.
7,784,697 B2 8/2010 Johnston et al.
7,791,009 B2 9/2010 Johnston et al.
7,792,378 B2 9/2010 Liege et al.
7,794,394 B2 9/2010 Frangioni
7,813,538 B2 10/2010 Carroll et al.
7,914,447 B2 3/2011 Kanai
7,916,193 B2 3/2011 Fossum
7,935,050 B2 5/2011 Luanava et al.
7,944,566 B2 5/2011 Xie
7,969,097 B2 6/2011 Van De Ven
7,995,123 B2 8/2011 Lee et al.
8,040,394 B2 10/2011 Fossum et al.
8,054,339 B2 11/2011 Fossum et al.
8,100,826 B2 1/2012 MacKinnon et al.
8,159,584 B2 4/2012 Iwabuchi et al.
8,193,542 B2 6/2012 Maehara
8,212,884 B2 7/2012 Seibel et al.
8,231,522 B2 7/2012 Endo et al.
8,300,111 B2 10/2012 Iwane
8,372,003 B2 2/2013 St. George et al.
8,382,662 B2 2/2013 Soper et al.
8,396,535 B2 3/2013 Wang et al.
8,423,110 B2 4/2013 Barbato et al.
8,471,938 B2 6/2013 Altice, Jr. et al.
8,476,575 B2 7/2013 Mokhnatyuk
8,493,474 B2 7/2013 Richardson
8,493,564 B2 7/2013 Brukilacchio et al.
8,523,367 B2 9/2013 Ogura
8,537,203 B2 9/2013 Seibel et al.
8,559,743 B2 10/2013 Liege et al.
8,582,011 B2 11/2013 Dosluoglu
8,602,971 B2 12/2013 Farr
8,610,808 B2 12/2013 Prescher et al.
8,614,754 B2 12/2013 Fossum
8,625,016 B2 1/2014 Fossum et al.
8,638,847 B2 1/2014 Wang
8,648,287 B1 2/2014 Fossum
8,649,848 B2 2/2014 Crane et al.
8,668,339 B2 3/2014 Kabuki et al.
8,675,125 B2 3/2014 Cossairt et al.
8,698,887 B2 4/2014 Makino et al.
8,836,834 B2 9/2014 Hashimoto et al.
8,858,425 B2 10/2014 Farr et al.
8,885,034 B2 11/2014 Adair et al.
9,516,239 B2 12/2016 Blanquart et al.
2001/0017649 A1 8/2001 Yaron
2001/0030744 A1 10/2001 Chang
2001/0055462 A1 12/2001 Seibel
2002/0054219 A1 5/2002 Jaspers
2002/0064341 A1 5/2002 Fauver et al.
2002/0080248 A1 6/2002 Adair et al.
2002/0080359 A1 6/2002 Denk et al.
2002/0140844 A1 10/2002 Kurokawa et al.
2002/0158986 A1 10/2002 Baer
2003/0007087 A1 1/2003 Hakamata et al.
2003/0007686 A1 1/2003 Roever
2003/0107664 A1 6/2003 Suzuki
2003/0189663 A1 10/2003 Dolt et al.
2004/0082833 A1 4/2004 Adler et al.
2004/0170712 A1 9/2004 Sadek El Mogy
2005/0009982 A1 1/2005 Inagaki et al.
2005/0027164 A1 2/2005 Barbato et al.
2005/0038322 A1 2/2005 Banik
2005/0113641 A1 5/2005 Bala
2005/0122530 A1 6/2005 Denk et al.
2005/0151866 A1 7/2005 Ando et al.
2005/0200291 A1 9/2005 Naugler, Jr. et al.
2005/0234302 A1 10/2005 MacKinnon et al.
2005/0237384 A1* 10/2005 Jess .................... G02B 21/0012 348/42
2005/0261552 A1 11/2005 Muri et al.
2005/0288546 A1 12/2005 Sonnenschein et al.
2006/0069314 A1 3/2006 Farr
2006/0087841 A1 4/2006 Chern et al.
2006/0202036 A1 9/2006 Wang et al.
2006/0221250 A1 10/2006 Rossbach et al.
2006/0226231 A1 10/2006 Johnston et al.
2006/0264734 A1 11/2006 Kimoto et al.
2006/0274335 A1 12/2006 Wittenstein
2007/0010712 A1 1/2007 Negishi
2007/0041448 A1 2/2007 Miller et al.
2007/0083085 A1 4/2007 Birnkrant et al.
2007/0129601 A1 6/2007 Johnston et al.
2007/0147033 A1 6/2007 Ogawa et al.
2007/0244364 A1 10/2007 Luanava et al.
2007/0244365 A1 10/2007 Wiklof
2007/0276187 A1 11/2007 Wiklof et al.
2007/0279486 A1 12/2007 Bayer et al.
2007/0285526 A1 12/2007 Mann et al.
2008/0045800 A2 2/2008 Farr
2008/0088719 A1* 4/2008 Jacob ................... H04N 5/2256 348/241
2008/0107333 A1 5/2008 Mazinani et al.
2008/0136953 A1 6/2008 Barnea et al.
2008/0158348 A1 7/2008 Karpen et al.
2008/0165360 A1 7/2008 Johnston
2008/0192131 A1 8/2008 Kim et al.
2008/0218598 A1 9/2008 Harada et al.
2008/0218615 A1 9/2008 Huang et al.
2008/0218824 A1 9/2008 Johnston et al.
2008/0249369 A1 10/2008 Seibel et al.
2009/0012361 A1 1/2009 MacKinnon et al.
2009/0012368 A1 1/2009 Banik
2009/0021588 A1 1/2009 Border et al.
2009/0024000 A1 1/2009 Chen
2009/0028465 A1 1/2009 Pan
2009/0074265 A1 3/2009 Huang et al.
2009/0091645 A1 4/2009 Trimeche et al.
2009/0137893 A1 5/2009 Seibel et al.
2009/0147077 A1 6/2009 Tani et al.
2009/0154886 A1 6/2009 Lewis et al.
2009/0160976 A1 6/2009 Chen et al.
2009/0189530 A1 7/2009 Ashdown et al.
2009/0208143 A1 8/2009 Yoon et al.
2009/0227847 A1 9/2009 Tepper et al.
2009/0232213 A1 9/2009 Jia
2009/0259102 A1 10/2009 Koninckx et al.
2009/0268063 A1 10/2009 Ellis-Monaghan et al.
2009/0292168 A1 11/2009 Farr
2009/0309500 A1 12/2009 Reisch
2009/0316116 A1 12/2009 Melville et al.
2009/0322912 A1 12/2009 Blanquart
2010/0049180 A1 2/2010 Wells et al.
2010/0069713 A1 3/2010 Endo et al.
2010/0102199 A1 4/2010 Negley et al.
2010/0121142 A1 5/2010 OuYang et al.
2010/0121143 A1 5/2010 Sugimoto et al.
2010/0123775 A1 5/2010 Shibasaki
2010/0134608 A1 6/2010 Shibasaki

(56) References Cited

U.S. PATENT DOCUMENTS

| | | | |
|---|---|---|---|
| 2010/0134662 | A1 | 6/2010 | Bub |
| 2010/0135398 | A1* | 6/2010 | Wittmann ............ H04N 19/139 375/240.16 |
| 2010/0137684 | A1 | 6/2010 | Shibasaki et al. |
| 2010/0149421 | A1 | 6/2010 | Lin et al. |
| 2010/0157037 | A1 | 6/2010 | Iketani et al. |
| 2010/0157039 | A1 | 6/2010 | Sugai |
| 2010/0165087 | A1 | 7/2010 | Corso et al. |
| 2010/0171429 | A1 | 7/2010 | Garcia et al. |
| 2010/0182446 | A1 | 7/2010 | Matsubayashi |
| 2010/0198009 | A1 | 8/2010 | Farr et al. |
| 2010/0198134 | A1 | 8/2010 | Eckhouse et al. |
| 2010/0201797 | A1 | 8/2010 | Shizukuishi et al. |
| 2010/0228089 | A1 | 9/2010 | Hoffman et al. |
| 2010/0261961 | A1 | 10/2010 | Scott et al. |
| 2010/0274082 | A1 | 10/2010 | Iguchi et al. |
| 2010/0274090 | A1 | 10/2010 | Ozaki et al. |
| 2010/0305406 | A1 | 12/2010 | Braun et al. |
| 2010/0309333 | A1 | 12/2010 | Smith et al. |
| 2011/0028790 | A1 | 2/2011 | Farr et al. |
| 2011/0063483 | A1 | 3/2011 | Rossi et al. |
| 2011/0122301 | A1 | 5/2011 | Yamura et al. |
| 2011/0149358 | A1 | 6/2011 | Cheng |
| 2011/0181709 | A1 | 7/2011 | Wright et al. |
| 2011/0181840 | A1 | 7/2011 | Cobb |
| 2011/0184239 | A1 | 7/2011 | Wright et al. |
| 2011/0184243 | A1 | 7/2011 | Wright et al. |
| 2011/0208004 | A1 | 8/2011 | Feingold et al. |
| 2011/0212649 | A1 | 9/2011 | Stokoe et al. |
| 2011/0237882 | A1 | 9/2011 | Saito |
| 2011/0237884 | A1 | 9/2011 | Saito |
| 2011/0245605 | A1 | 10/2011 | Jacobsen et al. |
| 2011/0245616 | A1 | 10/2011 | Kobayashi |
| 2011/0255844 | A1 | 10/2011 | Wu et al. |
| 2011/0274175 | A1 | 11/2011 | Sumitomo |
| 2011/0279679 | A1* | 11/2011 | Samuel ................ A61B 5/0059 348/162 |
| 2011/0288374 | A1 | 11/2011 | Hadani et al. |
| 2011/0292258 | A1 | 12/2011 | Adler et al. |
| 2011/0295061 | A1 | 12/2011 | Haramaty et al. |
| 2012/0004508 | A1 | 1/2012 | McDowall et al. |
| 2012/0014563 | A1 | 1/2012 | Bendall |
| 2012/0029279 | A1 | 2/2012 | Kucklick |
| 2012/0033118 | A1 | 2/2012 | Lee et al. |
| 2012/0041267 | A1 | 2/2012 | Benning et al. |
| 2012/0041534 | A1 | 2/2012 | Clerc et al. |
| 2012/0050592 | A1 | 3/2012 | Oguma |
| 2012/0078052 | A1 | 3/2012 | Cheng |
| 2012/0098933 | A1 | 4/2012 | Robinson et al. |
| 2012/0104230 | A1 | 5/2012 | Eismann et al. |
| 2012/0113506 | A1 | 5/2012 | Gmitro et al. |
| 2012/0120282 | A1 | 5/2012 | Goris |
| 2012/0140302 | A1 | 6/2012 | Xie et al. |
| 2012/0155761 | A1* | 6/2012 | Matsuoka ............... G06T 5/006 382/167 |
| 2012/0157774 | A1 | 6/2012 | Kaku |
| 2012/0194686 | A1* | 8/2012 | Lin ...................... H04N 5/2355 348/208.4 |
| 2012/0197080 | A1 | 8/2012 | Murayama |
| 2012/0242975 | A1 | 9/2012 | Min et al. |
| 2012/0262621 | A1 | 10/2012 | Sato et al. |
| 2012/0281111 | A1 | 11/2012 | Jo et al. |
| 2013/0035545 | A1 | 2/2013 | Ono |
| 2013/0053642 | A1 | 2/2013 | Mizuyoshi et al. |
| 2013/0070071 | A1 | 3/2013 | Peltie et al. |
| 2013/0126708 | A1 | 5/2013 | Blanquart |
| 2013/0127934 | A1 | 5/2013 | Chiang |
| 2013/0135589 | A1 | 5/2013 | Curtis et al. |
| 2013/0144120 | A1 | 6/2013 | Yamazaki |
| 2013/0155215 | A1 | 6/2013 | Shimada et al. |
| 2013/0155305 | A1 | 6/2013 | Shintani |
| 2013/0158346 | A1 | 6/2013 | Soper et al. |
| 2013/0184524 | A1 | 7/2013 | Shimada et al. |
| 2013/0211217 | A1 | 8/2013 | Yamaguchi et al. |
| 2013/0242069 | A1 | 9/2013 | Kobayashi |
| 2013/0244453 | A1 | 9/2013 | Sakamoto |
| 2013/0274597 | A1 | 10/2013 | Byrne et al. |
| 2013/0296652 | A1 | 11/2013 | Farr |
| 2013/0308837 | A1 | 11/2013 | DiCarlo et al. |
| 2013/0342690 | A1* | 12/2013 | Williams ............... H04N 5/232 348/143 |
| 2014/0005532 | A1 | 1/2014 | Choi et al. |
| 2014/0022365 | A1 | 1/2014 | Yoshino |
| 2014/0031623 | A1 | 1/2014 | Kagaya |
| 2014/0052004 | A1 | 2/2014 | D'Alfonso et al. |
| 2014/0073852 | A1 | 3/2014 | Banik et al. |
| 2014/0073853 | A1 | 3/2014 | Swisher et al. |
| 2014/0078278 | A1 | 3/2014 | Lei |
| 2014/0088363 | A1 | 3/2014 | Sakai et al. |
| 2014/0104466 | A1 | 4/2014 | Fossum |
| 2014/0160318 | A1 | 6/2014 | Blanquart et al. |
| 2014/0163319 | A1 | 6/2014 | Blanquart et al. |
| 2014/0203084 | A1 | 7/2014 | Wang |
| 2014/0267851 | A1 | 9/2014 | Rhoads |
| 2014/0268860 | A1 | 9/2014 | Talbert et al. |
| 2014/0288365 | A1 | 9/2014 | Henley et al. |
| 2014/0300698 | A1 | 10/2014 | Wany |
| 2014/0316199 | A1 | 10/2014 | Kucklick |
| 2014/0354788 | A1 | 12/2014 | Yano |
| 2014/0364689 | A1 | 12/2014 | Adair et al. |
| 2015/0271370 | A1 | 9/2015 | Henley et al. |
| 2016/0183775 | A1 | 6/2016 | Blanquart et al. |

FOREIGN PATENT DOCUMENTS

| | | | |
|---|---|---|---|
| CN | 101449575 | A | 6/2009 |
| CN | 101755448 | A | 6/2010 |
| CN | 102469932 | A | 5/2012 |
| EP | 0660616 | A2 | 6/1995 |
| EP | 1079255 | A2 | 2/2001 |
| EP | 1637062 | A1 | 3/2006 |
| EP | 1712177 | A1 | 10/2006 |
| EP | 1819151 | A1 | 8/2007 |
| EP | 2359739 | A1 | 8/2011 |
| EP | 2371268 | A1 | 10/2011 |
| WO | 9605693 | | 2/1996 |
| WO | WO2009120228 | A1 | 10/2009 |
| WO | 2012043771 | A1 | 4/2012 |

* cited by examiner

SUPER RESOLUTION AND COLOR MOTION ARTIFACT CORRECTION IN A PULSED COLOR IMAGING SYSTEM

CROSS-REFERENCE TO RELATED APPLICATIONS

This application claims the benefit of (1) U.S. Provisional Application No. 61/790,487, filed Mar. 15, 2013, (2) U.S. Provisional Application No. 61/790,804, filed Mar. 15, 2013; and (3) U.S. Provisional Application No. 61/791,473, filed Mar. 15, 2013, all of which are hereby incorporated by reference herein in their entireties, including but not limited to those portions that specifically appear hereinafter, the incorporation by reference being made with the following exception: In the event that any portion of any of the above-referenced provisional applications is inconsistent with this application, this application supersedes said above-referenced provisional applications.

STATEMENT REGARDING FEDERALLY SPONSORED RESEARCH OR DEVELOPMENT

Not Applicable.

BACKGROUND

Advances in technology have provided advances in imaging capabilities for medical use. One area that has enjoyed some of the most beneficial advances is that of endoscopic surgical procedures because of the advances in the components that make up an endoscope.

The disclosure relates generally to electromagnetic sensing and sensors. The disclosure also relates generally to increasing the resolution and color accuracy of a video stream. The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
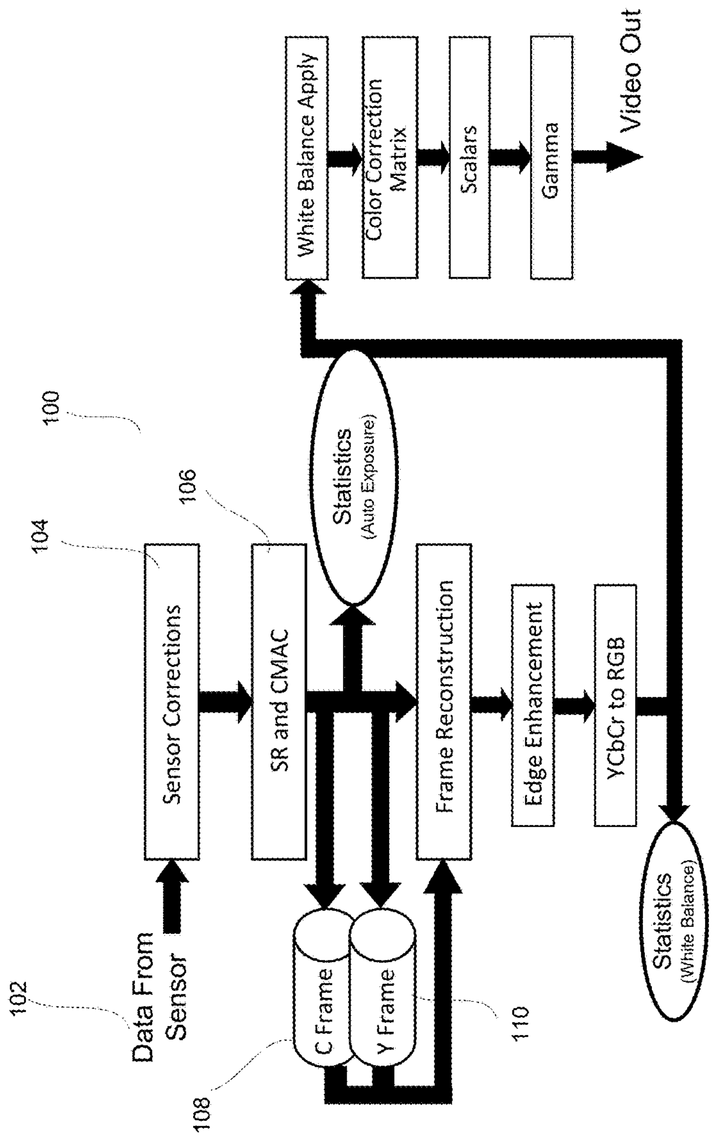
FIG. 1 illustrates a flow chart of a method and system for producing an image in a light deficient environment made in accordance with the principles and teachings of the disclosure.

The disclosure extends to methods, systems, and computer based products for digital imaging that may be primarily suited to medical applications. In the following description of the disclosure, reference is made to the accompanying drawings, which form a part hereof, and in which is shown by way of illustration specific implementations in which the disclosure may be practiced. It is understood that other implementations may be utilized and structural changes may be made without departing from the scope of the disclosure.

For any digital imaging system, the final quality of video depends fundamentally on the engineering details of the front-end image electronic capture process. Broadly speaking, perceived image quality is dependent on the following properties:

Signal to noise ratio (SNR)
Dynamic range (DR)
Spatial resolution
Perception of visible unnatural artifacts
Perception of spatial distortion
Color fidelity and appeal In general, manufacturers of cameras for many common purposes face continuous pressure toward greater miniaturization and lower cost. Both factors may have a detrimental effect however, on their ability to deliver high quality images.

More expensive cameras often use three monochrome sensors, precisely coupled to an elaborate arrangement of prisms and filters, since that provides for the best spatial resolution and color separation. Color cameras based on a single sensor generally have individual pixel-sized color filters fabricated onto the sensor in a mosaic arrangement. The most popular mosaic is the Bayer pattern, which exploits the fact that spatial resolution is more important for green data than for red or blue. While much cheaper to fabricate, Bayer based cameras cannot achieve the image quality realized by three-sensor solutions because of the spacing of the pattern. Sophisticated interpolation (demosaic) algorithms, such as that proposed by Malvar, He and Cutlar at Microsoft Research, help to reduce the resolution loss, but it can never be fully recovered. Another undesirable side-effect comes in the form of artifacts introduced by the color segmentation pattern, which are especially egregious around black and white edges. This can be addressed by lowering the optical MTF, but that may further degrade the final camera resolution.

If pixel count is a valued trait, that may necessitate smaller pixels in order to make a marketable product. Smaller pixels naturally have lower signal capacity which may reduce the dynamic range. Lower signal capacity also means the maximum possible signal to noise ratio is reduced, since photon shot noise scales as the square root of the signal charge. Lowering the pixel area also reduces the sensitivity, not only in proportion with the capture area, but quite likely at an even greater rate than that. This is because it becomes harder to direct photons into the light sensitive structure and thus to maintain quantum efficiency. Loss of sensitivity may be compensated by lowering the F-number, however, that may reduce the depth of focus (which impacts the resolution), and may lead to greater spatial distortion. Smaller pixels are also harder to manufacture consistently, which may result in greater defect rates, etc.

Rather than making the pixels smaller, it is thus desirable to seek other ways to bolster the resolution. This disclosure concerns an approach in which a monochrome sensor is employed. The color information is produced by illuminating different frames with alternating single wavelengths (i.e. red, green and blue) or combinations thereof. This allows the full pixel count to be exploited and Bayer artifacts to be avoided, as in three-sensor cameras. One issue with the frame-wise color switching arises from motion occurring within the scene, from frame to frame. Since different frames supply different color components, unnatural, colored effects may be visible, particularly in the vicinity of significant edges. Implementations may involve a full custom sensor capable of captured frame rates as high as e.g. 240 fps. Having access to such high rates allows for high progressive video rates (e.g. 60 P or higher), post-color reconstruction. While the high capture rate limits the impact of color motion artifacts, they may still be visible depending on the incident angular rate of motion of the scene, or of any object within it, relative to the sensor.

An implementation may employ an approach to colored frame pulsing in which the red, green and blue monochromatic sources are pulsed in combination. For every second frame, their relative energies are set in proportion to the standard luminance (Y) coefficients, so as to provide direct luminance information. On the alternate frames, the chrominance (Cb and Cr) information is provided by making a linear sum of the standard luminance and chrominance coefficients in order to bring the corresponding individual pulse energies to zero or positive values. The chrominance frames themselves alternate between Cb and Cr. This is referred to herein as the Y-Cb-Y-Cr sequence. This approach offers an advantage in terms of perceived resolution, compared with pure red, green and blue (R-G-B-G) pulsing, since all of the Y information per resulting output frame is derived from a single captured frame. With R-G-B-G pulsing, data is combined from three adjacent frames to provide the luminance. Therefore any motion will impact the resultant image sharpness.

A system designed for small diameter endoscopes with the image sensor placed at the distal end may be realized, which may preserve HD resolution, high inherent dynamic range and high sensitivity at the same time. The basis of this is a specially designed monochrome sensor which has fewer pixels than, e.g., a 1280×720 Bayer sensor, but which has superior spatial resolution by virtue of being monochrome. Maintaining a relatively large pixel at the expense of pixel count has multiple advantages for image quality, as discussed earlier.

In this disclosure, a method is described to further enhance the perceived resolution by applying the principal of super-resolution (SR) and to correct for the color artifacts resulting from the frame-wise modulation of color (CMAC), by making use of the motion information that is extracted by the SR algorithm.

Before the structure, systems and methods for producing an image in a light deficient environment are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms “a,” “an,” and “the” include plural referents unless the context clearly dictates otherwise.

As used herein, the terms “comprising,” “including,” “containing,” “characterized by,” and grammatical equivalents thereof are inclusive or open-ended terms that do not exclude additional, unrecited elements or method steps.

As used herein, the phrase “consisting of” and grammatical equivalents thereof exclude any element or step not specified in the claim.

As used herein, the phrase “consisting essentially of” and grammatical equivalents thereof limit the scope of a claim to the specified materials or steps and those that do not materially affect the basic and novel characteristic or characteristics of the claimed disclosure.

As used herein, the term “proximal” shall refer broadly to the concept of a portion nearest an origin.

As used herein, the term “distal” shall generally refer to the opposite of proximal, and thus to the concept of a portion farther from an origin, or a furthest portion, depending upon the context.

As used herein, color sensors or multi spectrum sensors are those sensors known to have a color filter array (CFA) thereon so as to filter the incoming electromagnetic radiation into its separate components. In the visual range of the electromagnetic spectrum, such a CFA may be built on a Bayer pattern or modification thereon in order to separate green, red and blue spectrum components of the light.

In super resolution (SR), data from multiple, adjacent frames are combined to produce individual frames with higher spatial resolution. This depends upon accurate motion detection within local regions of the scene. Since the luminance plane is the most critical for spatial resolution, this is done for luminance frames only (or for green frames in the case of R-G-B-G light pulsing).

The systems and methods disclosed herein will be described in the context of the Y-Cb-Cr light pulsing scheme. However, the systems and methods of the disclosure are not limited or restricted to that particular pulsing scheme and are also applicable to the R-G-B-G image sequence scenario, with G taking the place of Y, and R and B taking the place of Cr and Cb.

There are four types of captured frames. Thus, for example, imagine f is a continuously rotating frame index which repeatedly counts from 0 to 3 during active video capture.

Then:

If (f mod 4)=0 or (f mod 4)=2 it is a Y frame, containing pure luminance information.

If (f mod 4)=1, it is a 'Cb' frame, containing a linear sum of Y and Cb data (Cb+Y).

If (f mod 4)=3, it is a 'Cr' frame, containing a linear sum of Y and Cr data (Cr+Y).

During frame reconstruction (color fusion), there may be one full color frame (in YCbCr space) generated for each luminance frame at the input. The luminance data may be combined with the chrominance data from the frame prior to and the frame following the Y frame. Note that given this pulsing sequence, the position of the Cb frame with respect to the Y frame ping-pongs between the before and after slots for alternate Y cases, as does its complementary Cr component. Therefore, the data from each captured Cb or Cr (i.e., C) frame may actually be utilized in two resultant full-color images. The minimum frame latency may be provided by performing the color fusion process during C frame capture.

FIG. 1 illustrates a flow chart of a method and system 100 for producing an image, image stream, or video in a light deficient environment made in accordance with the principles and teachings of the disclosure. It will be appreciated that the super resolution (SR) and color motion artifact correction (CMAC) processes 106 may take place within the camera ISP on raw, captured sensor data 102, right after all the digital sensor correction processes 104 and prior to fusion into linear RGB or YCbCr space color images. FIG. 1 illustrates placement of super resolution (SR) and color motion artifact correction (CMAC) within a camera ISP chain designed for frame-wise color modulation with Y-Cb-Y-Cr sequencing.

Two frame FIFOs are constructed, one for Y frames 110 in arrival order, the other for Cb plus Cr frames 108. The number of frames to use for the super resolution (SR) process is an optional variable. The Y FIFO depth would normally be odd in an actual embodiment, and its size would be determined by the available processing, memory or memory-bandwidth, or by motion detection precision or acceptable latency considerations. CMAC can in principle be performed with the minimum FIFO depth of 3 frames for Y and 2 for C. For the super resolution (SR) aspect, the use of 5 'Y' frames may result in better resolution. On Y frames, the current object frame may be the central frame in the Y FIFO. On chrominance frames, the two C frames that flank the central Y frame may be adjusted in order to line up their motion to the central Y frame.

The motion detection method described here may be based upon the block matching approach which provides x and y motion vectors for small, independent blocks of pixels of configurable dimensions. There are other motion detection algorithms that could also be used in principle. Block matching offers advantages for simplicity of implementation, particularly for real time processing in hardware. A 2-stage match process is described which provides for a super resolved frame with double the pixel count in x and y. Further stages could be added to increase the pixel count further, however many more buffered frames and computation would be required to make it worthwhile.

In addition to the raw, buffered, Y object frame sitting in the middle of the Y FIFO (referred to as RY), three ×2 up-scaled versions of it may be created. The first may be up-scaled using bilinear interpolation (referred to as buffer BL), the second using bicubic interpolation (buffer BC) and the third with no interpolation, just zeros where the empty pixels are (called NI). BL may be used in the block matching method, NI forms the baseline for the super-resolved frame and BC is the fallback pixel source for unfilled pixels within the super-resolved frame.

Figure 2:
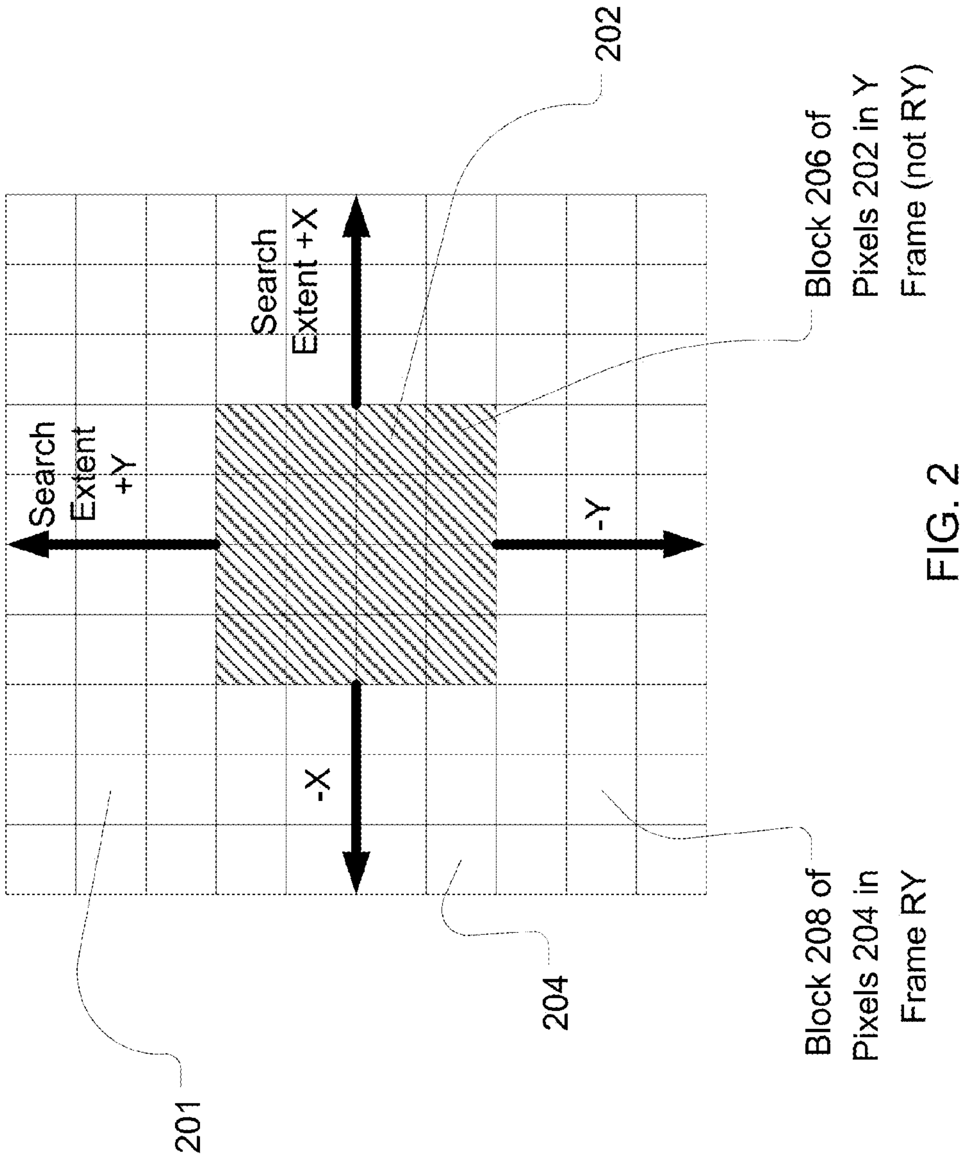
FIG. 2 is an illustration of a schematic of a pixel array configured in an x and y plane.

Referring to FIG. 2, there is illustrated a schematic of a pixel array 201 configured in an x and y plane. For each Y frame in the buffer, except for RY, the array may be segmented into square blocks 206 of some dimension, (e.g., 4×4). Each block 206 of pixels 202 may be shifted around, one pixel at a time, in both x and y, within some defined range of shifts in both + and − directions (e.g., +/−3 pixels). For each location it may be compared to the equivalent block 208 of pixels 204 sitting in that location with the object frame, RY. The x and y shifts encountered for the best match position become the recorded Cartesian motion co-ordinates for all pixels within the block. There may be various ways to make the comparison and a relatively convenient metric. One implementation may be to take the modulus of the pixel differences, (i.e., between the stationary pixel 204 in RY and the corresponding pixel in the block 206 under study), summed over all pixels in the block. The best match may be taken as the minimum of this value. It can also be recorded for each block as a matching quality metric, which may be used to arbitrate between competing pixels during the super resolution (SR) process. In an implementation, the minimum sum of squared differences may be used as the matching metric, for example.

Figure 3:
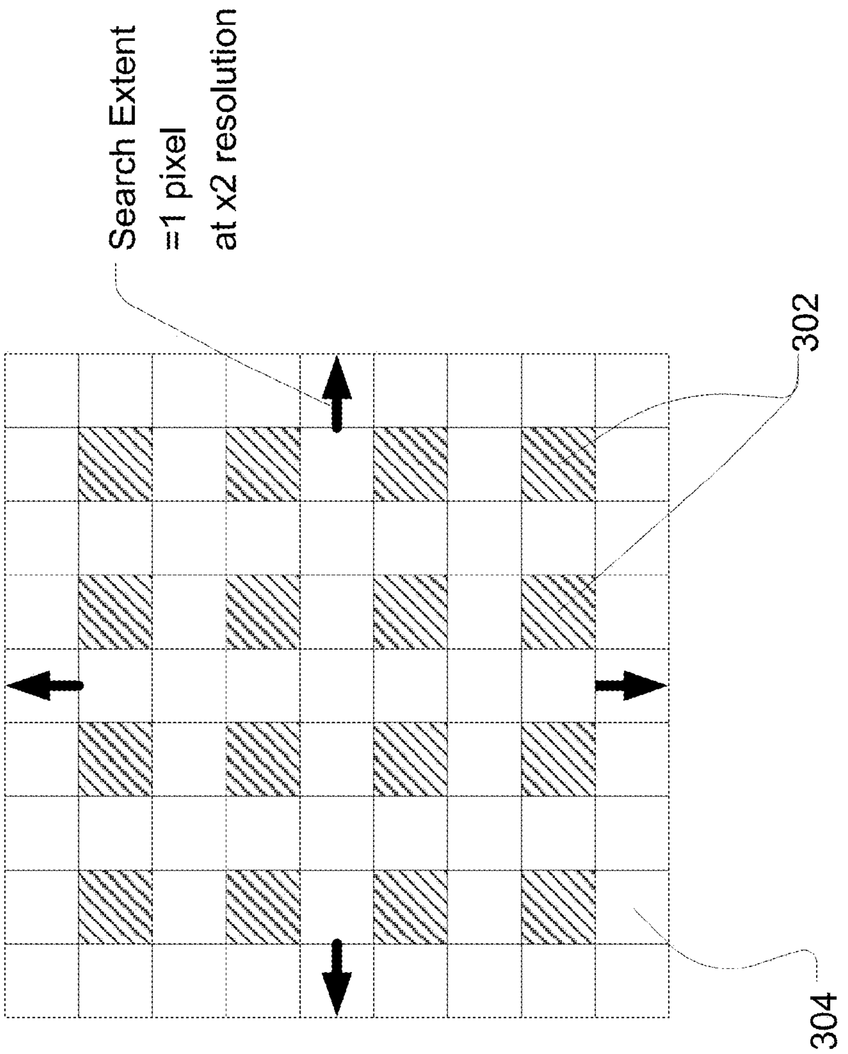
FIG. 3 is an illustration of a schematic of a pixel array configured in an x and y plane in accordance with the principles and teachings of the disclosure.

Referring now to FIG. 3, at this stage, each pixel 302 within non-RY, Y-frames, has a motion estimate that is quantized at the captured resolution. This may not provide a feature or use for super resolution (SR), but it can nevertheless be used for the CMAC, if no super resolution (SR) is desired. If ×2 super resolution is sought, the next stage involves, for block of pixels 306 within the non-RY frames 302, comparing to the BL buffer instead of the RY buffer. Starting from the best shifted position (according to the recorded motion vectors), shifts are performed by + and −1 half-pixel, giving a total of 9 possible positions as illustrated best in FIG. 3. A half-pixel in the Y frame under study is one whole pixel with respect to BL. Of those 9 possible pixel positions, the best match is again determined and the recorded motion vector is adjusted accordingly. If the motion vector at this stage has a half integer component (with ~75% probability), then it has the potential to enhance the final resolution.

Motion vectors for the two Y frames flanking RY, may be saved for the CMAC process, which occurs during the C frames.

The super resolution (SR) process itself may involve combining data from multiple Y frames into a central super-resolved frame, which is stationary with respect to the RY buffer. For each of the non-central Y buffers, a ×2 up-scaled version may be produced, in which the individual blocks have been shifted according to their (x,y) motion vectors. Any pixels at the ×2 resolution that are not filled after shifting are left blank.

The basis of the super-resolved frame is the NI buffer, which is the up-scaled version of RY with no interpolation. Three out of every four pixels in NI may be initially blank, and the primary objective is to fill the pixels with data from the up-scaled & shifted Y buffers. One approach may be to scan through the pixels looking for the first match for each empty pixel. At the end, any pixels that are still blank may be filled in from the BC buffer, which is the bicubic interpolated version of the central Y frame. Another approach to filling blank pixels may be to assess all possible candidates and choose the best one, based on some parameter that has been logged as a motion estimate quality metric. An example of such a metric may be the minimum sum of absolute differences for the originating block of pixels, or some derivative thereof. This requires at least one additional frame buffer per Y frame. Alternatively, all candidates can be combined in some way, e.g., as an average, which can be, e.g., weighted according to a quality parameter. In this case, even the non-zero pixels in NI can be substituted as well. The benefit may be that in addition to enhancing the resolution, the net signal to noise ratio is improved. Candidates with notably poor quality values can also be rejected altogether.

Figure 4:
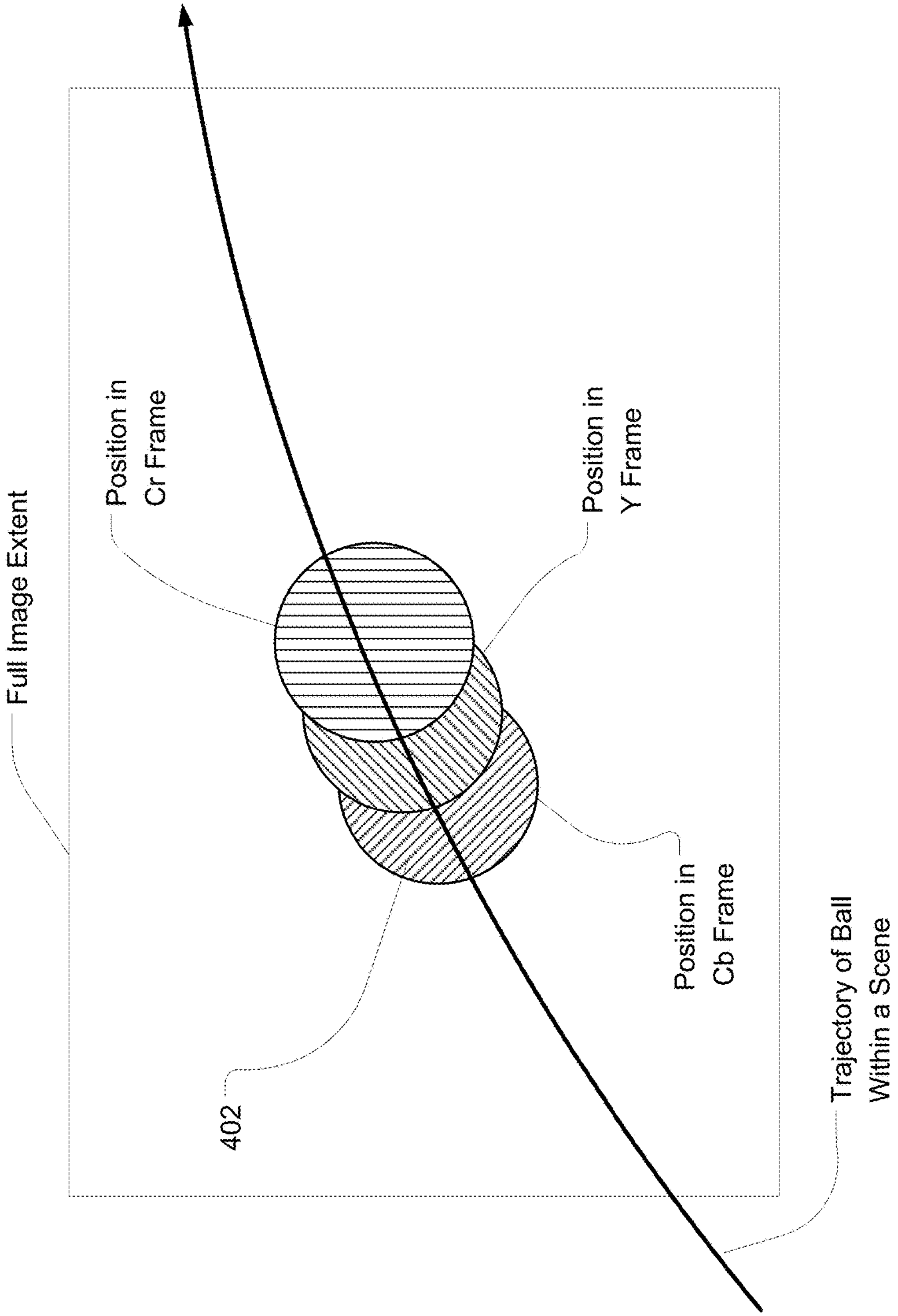
FIG. 4 is a graphical representation of an imaged object's motion through time in accordance with the principles and teachings of the disclosure.

FIG. 4 illustrates the issue of significant motion from frame to frame with frame-wise color modulation. In the figure, the ball 402 is illustrated as moving on a trajectory across the scene during capture, resulting in different positions for the Y, Cb and Cr components. The color motion artifact correction may utilize the relative motion estimate for adjacent Y frames, to predict the motion that occurred for the intermediate C frames relative to the Y frame, to which they become associated during color fusion. One implementation may be to take the motion vectors and divide them by 2. In this implementation, there is an assumption that any motion that has occurred from Y frame to Y frame is linear. In an implementation, if motion estimation is available for 3 or more Y frames in addition to the object frame (RY), then bicubic interpolation may be employed for a more precise interpolation.

The pixel shifting can take place either at the original or the doubled resolution, following a bicubic upscale. Either way, after shifting there are many void locations with various random shapes and sizes to be filled in.

The application of the motion information is a little different for CMAC compared with super resolution (SR). Super resolution (SR) has the bicubic up-scaled version of RY as its default, so the worst case is that a pixel void is filled by interpolation using its sixteen closest neighbors in the correct motion frame. For CMAC there may be no predicting the distance of the nearest filled neighbors, all is known is that it is limited to the original block search distance divided by two (in the case of linear interpolation). Some means of interpolation is thus required to fill in the holes. One implementation to do this is for each missing pixel, find the distance to the closest filled pixel in +x, −x, +y and −y, then fill with an average level that has been weighted according to the reciprocal of each distance.

It should be noted that as used herein the term "light" is both a particle and a wavelength, and is intended to denote electromagnetic radiation that is detectable by a pixel array, and may be include wavelengths from the visible and non-visible spectrums of electromagnetic radiation. The term "partition" is used herein to mean a predetermined range of wavelengths of the electromagnetic spectrum that is less than the entire spectrum, or in other words, wavelengths that make up some portion of the electromagnetic spectrum. An emitter may be a light source that is controllable as to the portion of the electromagnetic spectrum that is emitted, the intensity of the emissions, or the duration of the emission, or all three. An emitter may emit light in any dithered, diffused, or columnated emission and may be controlled digitally or through analog methods or systems.

A pixel array of an image sensor may be paired with an emitter electronically, such that they are synced during operation for both receiving the emissions and for the adjustments made within the system. An emitter may be tuned to emit electromagnetic radiation, which may be pulsed in order to illuminate an object. It will be appreciated that the emitter may be in the form of a laser, which may be pulsed in order to illuminate an object. The emitter may pulse at an interval that corresponds to the operation and functionality of a pixel array. The emitter may pulse light in a plurality of electromagnetic partitions, such that the pixel array receives electromagnetic energy and produces a data set that corresponds (in time) with each specific electromagnetic partition.

A system may comprise a monochromatic pixel array (black and white), which is simply sensitive to electromagnetic radiation of any wavelength. The light emitter illustrated in the figure may be a laser emitter that is capable of emitting a green electromagnetic partition, a blue electromagnetic partition, and a red electromagnetic partition in any desired sequence. It will be appreciated that other light emitters may be used without departing from the scope of the disclosure, such as digital or analog based emitters.

During operation, the data created by the monochromatic sensor for any individual pulse may be assigned a specific color partition, wherein the assignment may be based on the timing of the pulsed color partition from the emitter. Even though the pixels are not color dedicated they can be assigned a color for any given data set based on timing. In one embodiment, three data sets representing RED, GREEN and BLUE pulses may then be combined to form a single image frame. It will be appreciated that the disclosure is not limited to any particular color combination or any particular electromagnetic partition, and that any color combination or any electromagnetic partition may be used in place of RED, GREEN and BLUE, such as Cyan, Magenta and Yellow, Ultraviolet, infra-red, or any other color combination, including all visible and non-visible wavelengths, without departing from the scope of the disclosure. The object to be imaged contains a red portion, green portion and a blue portion. As illustrated in the figure, the reflected light from the electromagnetic pulses only contains the data for the portion of the object having the specific color that corresponds to the pulsed color partition. Those separate color (or color interval) data sets can then be used to reconstruct the image by combining the data sets.

Implementations of the disclosure may comprise or utilize a special purpose or general-purpose computer including computer hardware, such as, for example, one or more processors and system memory, as discussed in greater detail below. Implementations within the scope of the disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. In an implementation, a sensor and camera control unit may be networked in order to communicate with each other, and other components, connected over the network to which they are connected. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures that can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, control units, camera control units, hand-held devices, hand pieces, multi-processor systems, microprocessor-based or programmable consumer electronics, network PCs, minicomputers, mainframe computers, mobile telephones, PDAs, tablets, pagers, routers, switches, various storage devices, and the like. It should be noted that any of the above mentioned computing devices may be provided by or located within a brick and mortar location. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) or field programmable gate arrays can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

Figure 5:
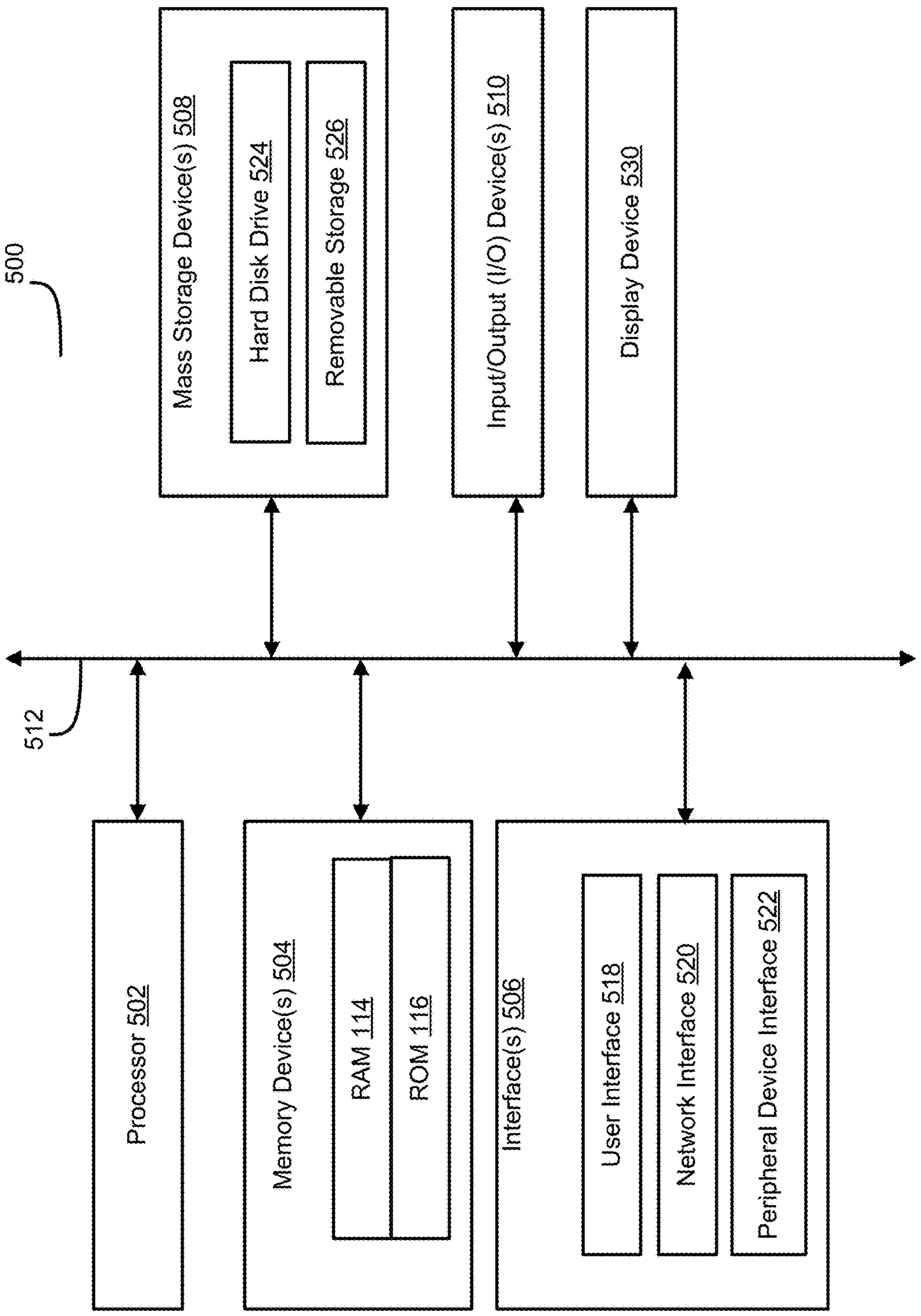
FIG. 5 illustrates a schematic of supporting and enabling hardware in accordance with the principles and teachings of the disclosure.

FIG. 5 is a block diagram illustrating an example computing device 500. Computing device 500 may be used to perform various procedures, such as those discussed herein. Computing device 500 can function as a server, a client, or any other computing entity. Computing device can perform various monitoring functions as discussed herein, and can execute one or more application programs, such as the application programs described herein. Computing device 500 can be any of a wide variety of computing devices, such as a desktop computer, a notebook computer, a server computer, a handheld computer, camera control unit, tablet computer and the like.

Computing device 500 includes one or more processor(s) 502, one or more memory device(s) 504, one or more interface(s) 506, one or more mass storage device(s) 508, one or more Input/Output (I/O) device(s) 510, and a display device 530 all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM) 514) and/or nonvolatile memory (e.g., read-only memory (ROM) 516). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. As shown in FIG. 5, a particular mass storage device is a hard disk drive 524. Various drives may also be included in mass storage device(s) 508 to enable reading from and/or writing to the various computer readable media. Mass storage device(s) 508 include removable media 526 and/or non-removable media.

I/O device(s) 510 include various devices that allow data and/or other information to be input to or retrieved from computing device 500. Example I/O device(s) 510 include digital imaging devices, electromagnetic sensors and emitters, cursor control devices, keyboards, keypads, microphones, monitors or other display devices, speakers, printers, network interface cards, modems, lenses, CCDs or other image capture devices, and the like.

Display device 530 includes any type of device capable of displaying information to one or more users of computing device 500. Examples of display device 530 include a monitor, display terminal, video projection device, and the like.

Interface(s) 106 include various interfaces that allow computing device 500 to interact with other systems, devices, or computing environments. Example interface(s) 506 may include any number of different network interfaces

520, such as interfaces to local area networks (LANs), wide area networks (WANs), wireless networks, and the Internet. Other interface(s) include user interface 518 and peripheral device interface 522. The interface(s) 506 may also include one or more user interface elements 518. The interface(s) 506 may also include one or more peripheral interfaces such as interfaces for printers, pointing devices (mice, track pad, etc.), keyboards, and the like.

Bus 512 allows processor(s) 502, memory device(s) 504, interface(s) 506, mass storage device(s) 508, and I/O device (s) 510 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 6A:
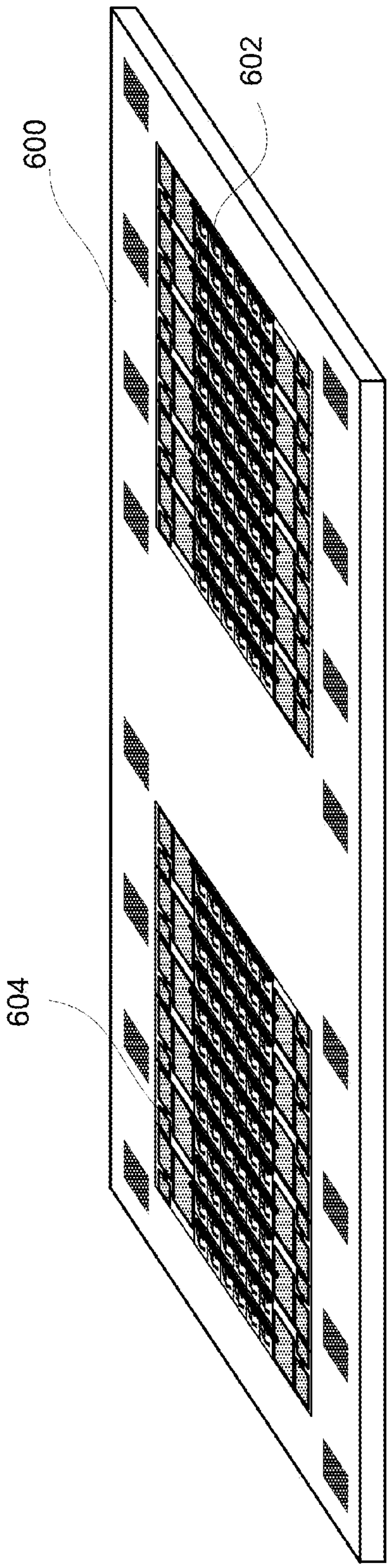
FIGS. 6A and 6B illustrate a perspective view and a side view, respectively, of an implementation of a monolithic sensor having a plurality of pixel arrays for producing a three dimensional image in accordance with the teachings and principles of the disclosure.
Figure 6B:
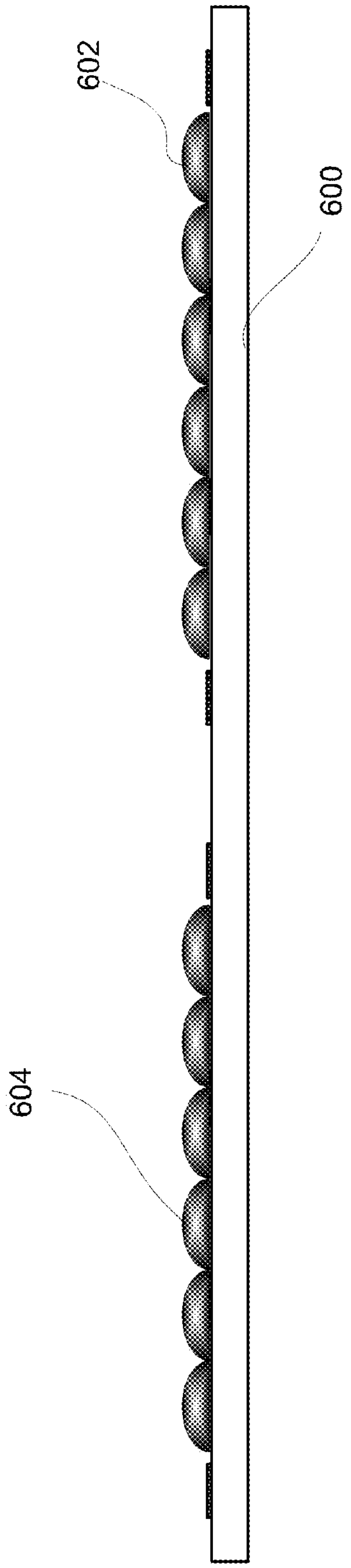

Referring now to FIGS. 6A and 6B, the figures illustrate a perspective view and a side view, respectively, of an implementation of a monolithic sensor 600 having a plurality of pixel arrays for producing a three dimensional image in accordance with the teachings and principles of the disclosure. Such an implementation may be desirable for three dimensional image capture, wherein the two pixel arrays 602 and 604 may be offset during use. In another implementation, a first pixel array 602 and a second pixel array 604 may be dedicated to receiving a predetermined range of wave lengths of electromagnetic radiation, wherein the first pixel array 602 is dedicated to a different range of wave length electromagnetic radiation than the second pixel array 604.

Figure 7A:
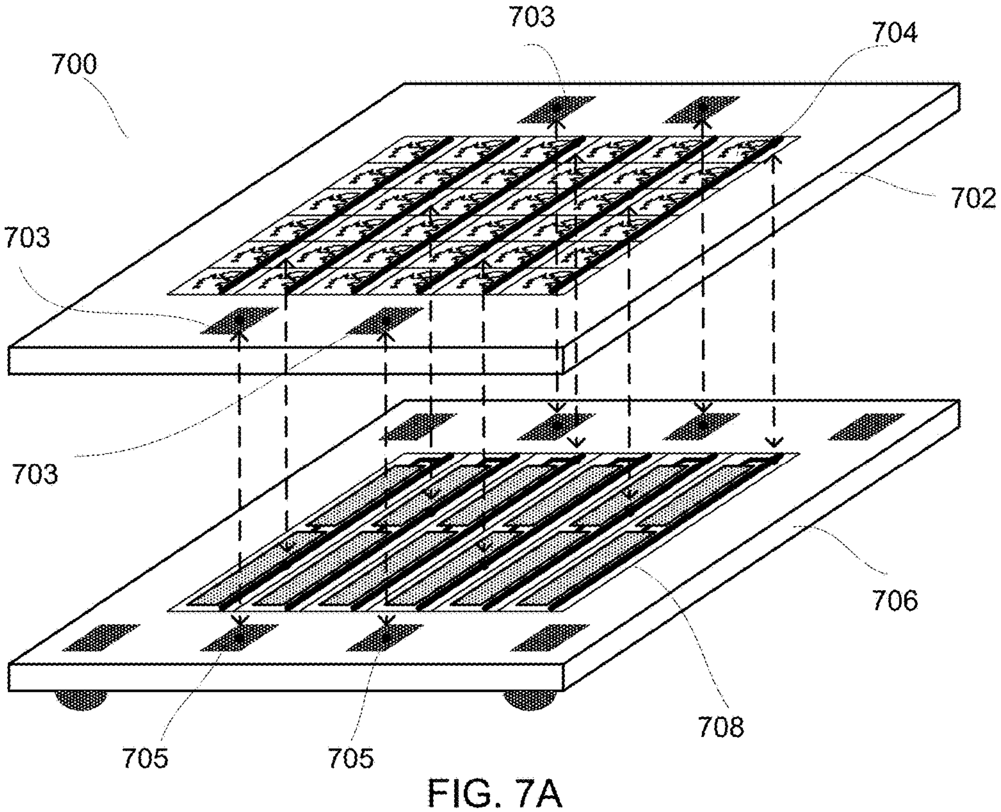
FIGS. 7A and 7B illustrate a perspective view and a side view, respectively, of an implementation of an imaging sensor built on a plurality of substrates, wherein a plurality of pixel columns forming the pixel array are located on the first substrate and a plurality of circuit columns are located on a second substrate and showing an electrical connection and communication between one column of pixels to its associated or corresponding column of circuitry.
Figure 7B:
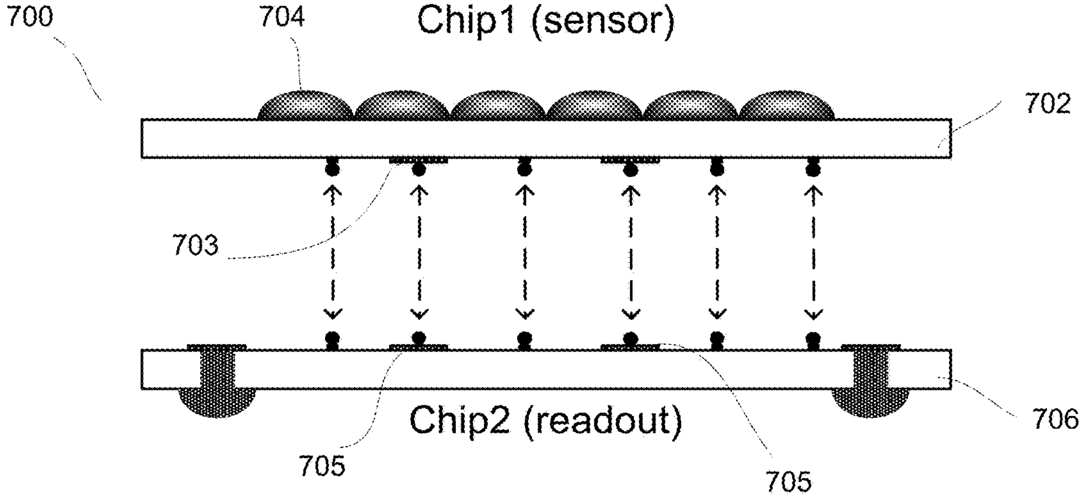

FIGS. 7A and 7B illustrate a perspective view and a side view, respectively, of an implementation of an imaging sensor 700 built on a plurality of substrates. As illustrated, a plurality of pixel columns 704 forming the pixel array are located on the first substrate 702 and a plurality of circuit columns 708 are located on a second substrate 706. Also illustrated in the figure are the electrical connection and communication between one column of pixels to its associated or corresponding column of circuitry. In one implementation, an image sensor, which might otherwise be manufactured with its pixel array and supporting circuitry on a single, monolithic substrate/chip, may have the pixel array separated from all or a majority of the supporting circuitry. The disclosure may use at least two substrates/chips, which will be stacked together using three-dimensional stacking technology. The first 702 of the two substrates/chips may be processed using an image CMOS process. The first substrate/chip 702 may be comprised either of a pixel array exclusively or a pixel array surrounded by limited circuitry. The second or subsequent substrate/chip 706 may be processed using any process, and does not have to be from an image CMOS process. The second substrate/chip 706 may be, but is not limited to, a highly dense digital process in order to integrate a variety and number of functions in a very limited space or area on the substrate/chip, or a mixed-mode or analog process in order to integrate for example precise analog functions, or a RF process in order to implement wireless capability, or MEMS (Micro-Electro-Mechanical Systems) in order to integrate MEMS devices. The image CMOS substrate/chip 702 may be stacked with the second or subsequent substrate/chip 706 using any three-dimensional technique. The second substrate/chip 706 may support most, or a majority, of the circuitry that would have otherwise been implemented in the first image CMOS chip 702 (if implemented on a monolithic substrate/chip) as peripheral circuits and therefore have increased the overall system area while keeping the pixel array size constant and optimized to the fullest extent possible. The electrical connection between the two substrates/chips may be done through interconnects 703 and 705, which may be wirebonds, bump and/or TSV (Through Silicon Via).

Figure 8A:
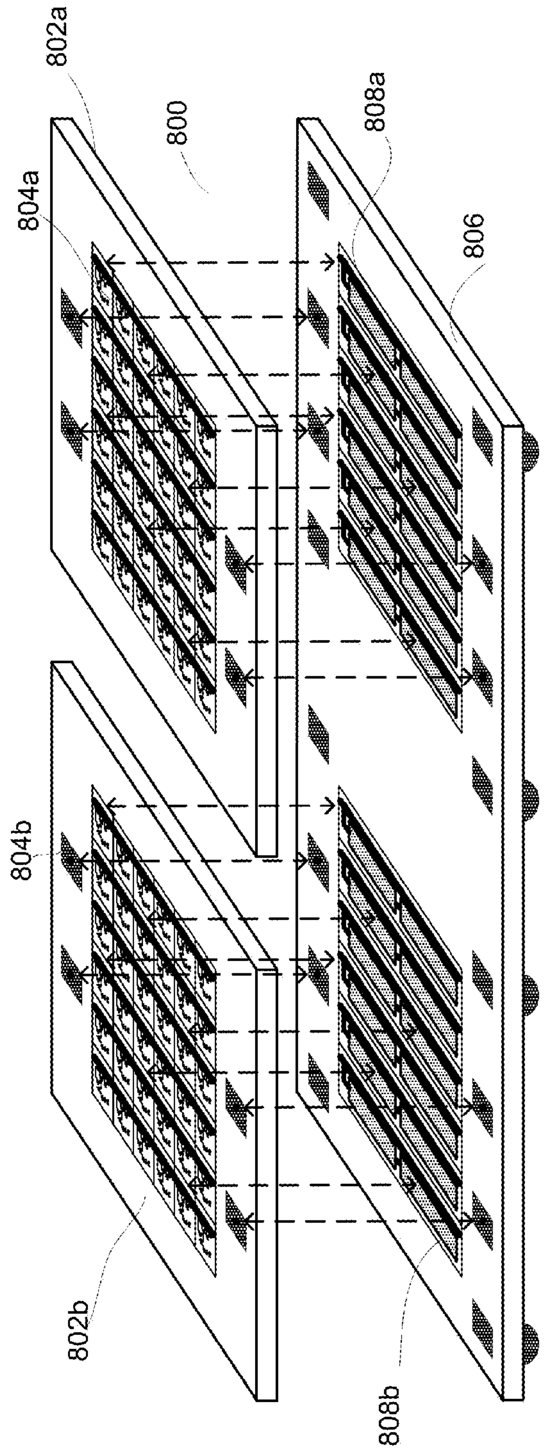
FIGS. 8A and 8B illustrate a perspective view and a side view, respectively, of an implementation of an imaging sensor having a plurality of pixel arrays for producing a three dimensional image, wherein the plurality of pixel arrays and the image sensor are built on a plurality of substrates.
Figure 8B:
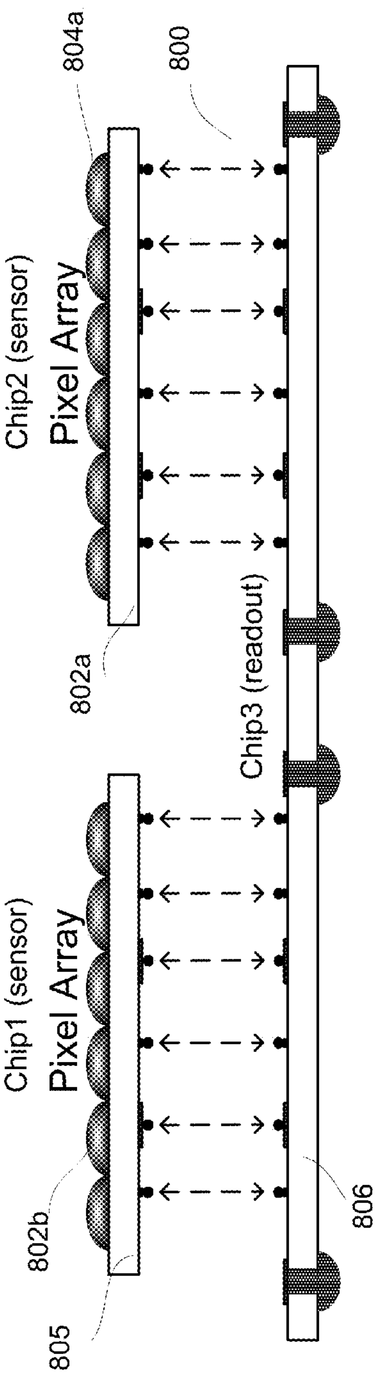

FIGS. 8A and 8B illustrate a perspective view and a side view, respectively, of an implementation of an imaging sensor 800 having a plurality of pixel arrays for producing a three dimensional image. The three dimensional image sensor may be built on a plurality of substrates and may comprise the plurality of pixel arrays and other associated circuitry, wherein a plurality of pixel columns **804*a* forming the first pixel array and a plurality of pixel columns 804*b* forming a second pixel array are located on respective substrates 802*a* and 802*b*, respectively, and a plurality of circuit columns 808*a* and 808*b* are located on a separate substrate 806**. Also illustrated are the electrical connections and communications between columns of pixels to associated or corresponding column of circuitry.

It will be appreciated that the teachings and principles of the disclosure may be used in a reusable device platform, a limited use device platform, a re-posable use device platform, or a single-use/disposable device platform without departing from the scope of the disclosure. It will be appreciated that in a re-usable device platform an end-user is responsible for cleaning and sterilization of the device. In a limited use device platform the device can be used for some specified amount of times before becoming inoperable. Typical new device is delivered sterile with additional uses requiring the end-user to clean and sterilize before additional uses. In a re-posable use device platform a third-party may reprocess the device (e.g., cleans, packages and sterilizes) a single-use device for additional uses at a lower cost than a new unit. In a single-use/disposable device platform a device is provided sterile to the operating room and used only once before being disposed of.

Additionally, the teachings and principles of the disclosure may include any and all wavelengths of electromagnetic energy, including the visible and non-visible spectrums, such as infrared (IR), ultraviolet (UV), and X-ray.

It will be appreciated that various features disclosed herein provide significant advantages and advancements in the art. The following embodiments are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The invention claimed is:

1. A digital imaging method for use with an endoscope in ambient light deficient environments comprising:

actuating an emitter to emit a plurality of pulses of electromagnetic radiation, wherein the plurality of pulses comprises a sequence of predetermined wavelengths of electromagnetic radiation to cause illumination within the light deficient environment;

pulsing said emitter at a predetermined interval;

sensing reflected electromagnetic radiation from each of said pulses with a pixel array;

wherein said pixel array is actuated at a sensing interval that corresponds to the pulse interval of said emitter;

creating a sample frame for each pulse of electromagnetic radiation in the sequence, wherein the sample frame comprises one of chrominance or luminance;

providing a plurality of sample frames to create an output frame, wherein the plurality of sample frames comprise a plurality of luminance sample frames and at least one chrominance sample frame;

detecting motion of objects being imaged;

increasing resolution for the pixel array by compensating for the detected motion based at least in part on the luminance sample frames;

wherein increasing resolution comprises:

sensing luminescence of a plurality of neighboring pixels to gather luminance data;

bilinear interpolating the luminance data into a first upscaled data set;

bicubic interpolating the luminance data into a second upscaled data set;

creating a baseline with no interpolation of the luminance data into a third upscaled data set; and creating a stream of images by combining each output frame, such that there is a constant output frame rate.

2. The method of claim 1, wherein said sensing process comprises sensing luminance and linear sums of luminance plus chrominance in adjacent images in a stream of images forming a video stream.

3. The method of claim 2, further comprising indexing frames within the video stream with a rotating frame index.

4. The method of claim 3, wherein the rotating frame index comprises four counts.

5. The method of claim 4, further comprising reconstructing the video stream by combining luminance and chrominance data from a prior indexed frame.

6. The method of claim 4, further comprising reconstructing the video stream by combining luminance and chrominance data from a prior indexed frame and following indexed frame.

7. The method of claim 4, further comprising reconstructing a frame for luminance and two frames for chrominance.

8. The method of claim 4, further comprising reconstructing the video stream by combining luminance and chrominance data from a plurality of prior indexed frames and a plurality of latter indexed frames for increased resolution and accuracy.

9. The method of claim 1, wherein the first upscaled data set is used for block matching.

10. The method of claim 1, wherein the second upscaled data set is used for fall back pixel data.

11. The method of claim 1, wherein the third upscaled data set forms the baseline for a resolution-enhanced data set.

12. The method of claim 1, further comprising segmenting data created by the pixel array into segments of pixels and nearest neighbors.

13. The method of claim 12, further comprising shifting each segment of pixels in the x direction and comparing with a neighboring frame at the same resolution, in order to determine motion of an object being imaged in the x direction.

14. The method of claim 13, further comprising shifting each segment of pixels in the x direction in sub-pixel increments and comparing to a first up-scaled data set for greater precision of motion detection in the x direction.

15. The method of claim 13, further comprising shifting each segment of pixels in the y direction and comparing with a neighboring frame at the same resolution, in order to determine motion of an object being imaged in the y direction.

16. The method of claim 15, further comprising shifting each segment of pixels in the y direction in sub-pixel increments and comparing to a first up-scaled data set for greater precision of motion detection in the y direction.

17. The method of claim 15, further comprising determining the vector of the motion of the object by combining the x and y motion of the object being imaged.

18. The method of claim 17, further comprising estimating motion to combine data from multiple luminance frames into a single, higher resolution luminance frame.

19. The method of claim 18, wherein said process is repeated for every frame containing luminance data in a continuous sequence.

20. The method of claim 19, further comprising utilizing the motion estimation between neighboring luminance frames to infer the motion at the intermediate frames, containing the chrominance data, with respect to luminance frames, by interpolation.

21. The method of claim 20, wherein said process is repeated for every frame containing chrominance data in a continuous sequence.

22. The method of claim 1, further comprising: actuating the emitter to emit a plurality of pulses of electromagnetic radiation in sequence to cause illumination; wherein a first pulse is within a first range that is only a portion of an electromagnetic spectrum, wherein a second pulse is within a second range that is only a portion of an electromagnetic spectrum, wherein a third pulse is within a third range that is only a portion of an electromagnetic spectrum, pulsing said pulses at a predetermined interval, wherein said pixel array is actuated at a first sensing interval that corresponds to the pulse interval of said first pulse, wherein said pixel array is actuated at a second sensing interval that corresponds to the pulse interval of said second pulse, and wherein said pixel array is actuated at a third sensing interval that corresponds to the pulse interval of said third pulse.

23. The method of claim 22, wherein a blanking interval is concurrent with a portion of any interval of said first pulse, second pulse, or third pulse.

24. The method of claim 1, wherein the method further comprises correcting for color artifacts due to the pulsing of the emitter and the detected motion, wherein the plurality of sample frames comprise adjacent luminance sample frames and an intermediate chrominance sample frame, and wherein the correcting for color artifacts utilizes a relative motion estimate for the adjacent luminance sample frames to predict motion that occurred for the intermediate chrominance frame relative to the luminance frames to which they become associated during a color fusion to create the output frame.

25. The method of claim 1, wherein said emitter is a laser diode.

26. The method of claim 1, wherein said emitter is a light emitting diode (LED).

27. A digital imaging method for use with an endoscope in ambient light deficient environments comprising:

actuating an emitter to emit a plurality of pulses of electromagnetic radiation, wherein the plurality of pulses comprises a sequence of predetermined wavelengths of electromagnetic radiation to cause illumination within the light deficient environment;

pulsing said emitter at a predetermined interval;

sensing reflected electromagnetic radiation from each of said pulses with a pixel array;

wherein said pixel array is actuated at a sensing interval that corresponds to the pulse interval of said emitter;

creating a sample frame for each pulse of electromagnetic radiation in the sequence, wherein the sample frame comprises one of chrominance or luminance;

providing a plurality of sample frames to create an output frame, wherein the plurality of sample frames comprise a plurality of luminance sample frames and at least one chrominance sample frame;

detecting motion of objects being imaged;

increasing resolution for the pixel array by compensating for the detected motion based at least in part on the luminance sample frames;

wherein increasing resolution comprises:

sensing luminescence of a plurality of neighboring pixels to gather luminance data;

bilinear interpolating the luminance data into a first upscaled data set;

bicubic interpolating the luminance data into a second upscaled data set;

creating a baseline with no interpolation of the luminance data into a third upscaled data set;

correcting for color artifacts due to the pulsing of the emitter and the detected motion; and creating a stream of images by combining each output frame, such that there is a constant output frame rate.

28. The method of claim 27, wherein the first upscaled data set is used for block matching.

29. The method of claim 27, wherein the second upscaled data set is used for fall back pixel data.

30. The method of claim 27, wherein the third upscaled data set forms the basis of a resolution-enhanced data set.

31. The method of claim 27, further comprising segmenting data created by the pixel array into segments of pixels and nearest neighbors.

32. The method of claim 31, further comprising shifting each segment of pixels in the x direction in order to determine motion of an object being imaged in the x direction.

33. The method of claim 32, further comprising shifting each segment of pixels in the y direction in order to determine motion of an object being imaged in the y direction.

34. The method of claim 33, further comprising determining the vector of the motion of the object by combining the x and y motion of the object being imaged.

35. The method of claim 34, further comprising plotting the motion of the object being imaged by accounting for the modulus of pixel differences between frames of the stream of images.

36. The method of claim 27, further comprising: actuating the emitter to emit a plurality of pulses of electromagnetic radiation in sequence to cause illumination, wherein a first pulse is within a first range that is only a portion of an electromagnetic spectrum, wherein a second pulse is within a second range that is only a portion of an electromagnetic spectrum, wherein a third pulse is within a third range that is only a portion of an electromagnetic spectrum, pulsing said pulses at a predetermined interval, wherein said pixel array is actuated at a first sensing interval that corresponds to the pulse interval of said first pulse, wherein said pixel array is actuated at a second sensing interval that corresponds to the pulse interval of said second pulse, and wherein said pixel array is actuated at a third sensing interval that corresponds to the pulse interval of said third pulse.

37. The method of claim 36, further comprising: actuating said emitter to not emit light for a calibration interval, and actuating said pixel array during said calibration interval.

38. The method of claim 37, further comprising: stopping further pulses if said pixel array senses light during said calibration interval.

39. The method of claim 36, wherein a blanking interval is not concurrent with any interval of said first beam of light, second beam of light, or third beam of light.

40. The method of claim 36, wherein a blanking interval is concurrent with a portion of any interval of said first pulse, second pulse, or third pulse.

41. The method of claim 36, wherein said pulse is of a green visible light spectrum range, and wherein said second pulse is of a red visible light spectrum, and wherein said third pulse is of a blue visible light spectrum.

42. The method of claim 36, wherein one of said pulses is from a non-visible range of electromagnetic spectrum.

43. The method of claim 36, wherein said sensor is configured to sense any of said first pulse, second pulse, and third pulse equally.

44. The method of claim 36, wherein said sensor is configured to sense any spectrum range of said electromagnetic spectrum.

45. The method of claim 27, wherein said emitter is a laser diode.

46. The method of claim 27, wherein said emitter is a light emitting diode (LED).

* * * * *